United States Patent
Lee et al.

(10) Patent No.: US 9,984,294 B2
(45) Date of Patent: May 29, 2018

(54) IMAGE CLASSIFICATION METHOD AND APPARATUS FOR PRESET TOUR CAMERA

(71) Applicant: REALHUB CORP., LTD., Busan (KR)

(72) Inventors: Kang-seok Lee, Busan (KR); Jeong-hyun Kim, Busan (KR); Bo-soon Kim, Busan (KR)

(73) Assignee: REARHUB CORP., LTD. (KR)

( * ) Notice: Subject to any disclaimer, the term of this patent is extended or adjusted under 35 U.S.C. 154(b) by 206 days.

(21) Appl. No.: 14/808,266

(22) Filed: Jul. 24, 2015

(65) Prior Publication Data
US 2016/0140423 A1    May 19, 2016

(30) Foreign Application Priority Data
Nov. 19, 2014  (KR) .................. 10-2014-0161713

(51) Int. Cl.
*G06K 9/00*    (2006.01)
*G06F 17/30*   (2006.01)

(52) U.S. Cl.
CPC ... *G06K 9/00771* (2013.01); *G06F 17/30265* (2013.01)

(58) Field of Classification Search
CPC .......... H04N 7/185; H04N 7/188; H04N 7/18; G06K 9/00624; G06K 9/00684; G06K 9/00664; G06K 9/00711; G06K 9/00718; G06K 9/00738; G06K 9/00765; G06K 9/00771; G06K 9/00778
See application file for complete search history.

(56) References Cited

U.S. PATENT DOCUMENTS

| | | | | |
|---|---|---|---|---|
| 6,850,025 B1* | 2/2005 | Paolantonio | ........... | G03B 17/55 318/599 |
| 8,026,945 B2* | 9/2011 | Garoutte | ........... | G08B 13/19608 348/143 |
| 9,363,487 B2* | 6/2016 | Chosak | ........... | G06K 9/00771 |
| 2003/0007663 A1* | 1/2003 | Wixson | ........... | H04N 7/17318 382/100 |
| 2004/0233983 A1* | 11/2004 | Crawford | ........ | G08B 13/19656 375/240.01 |
| 2006/0159308 A1* | 7/2006 | Hampapur | ........... | G06T 3/4038 382/103 |
| 2006/0182357 A1* | 8/2006 | Liu | ..................... | G06K 9/00771 382/239 |
| 2008/0130951 A1* | 6/2008 | Wren | ...................... | H04N 7/18 382/103 |

(Continued)

*Primary Examiner* — Wesley J Tucker
(74) *Attorney, Agent, or Firm* — Park & Associates IP Law, P.C.

(57) ABSTRACT

Disclosed herein is an image classification method and apparatus for a preset tour camera. More particularly, according to the image classification method and apparatus for a preset tour camera, a classification group is generated not to be duplicated by analyzing feature information included in image frames continuously taken by a preset tour camera that has panning, tilting, and zooming functions, and the image frames are classified by the classification group based on the feature information and stored with an index, whereby when an accident occurs and image analysis is required, the image frames are searched for based on the classification group, thus the image analysis may be conveniently and quickly performed.

6 Claims, 2 Drawing Sheets

(56) References Cited

U.S. PATENT DOCUMENTS

2012/0162416 A1\* 6/2012 Su .................... H04N 7/185
  348/143
2015/0161449 A1\* 6/2015 Armendariz ........... H04N 7/181
  348/159

\* cited by examiner

US 9,984,294 B2

IMAGE CLASSIFICATION METHOD AND APPARATUS FOR PRESET TOUR CAMERA

REFERENCE TO RELATED APPLICATIONS

This application claims the priority benefit of Korean Patent Application No. 10-2014-0161713 filed on Nov. 19, 2014, the entire contents of which are incorporated herein by reference.

FIELD OF THE INVENTION

The present invention generally relates to an image classification method and apparatus for a preset tour camera. More particularly, the present invention relates to an image classification method and apparatus for a preset tour camera, in which a classification group is generated not to be duplicated by analyzing feature information included in image frames continuously taken by a preset tour camera that has panning, tilting, and zooming functions, and the image frames are classified by the classification group based on the feature information and stored with an index, whereby when an accident occurs and image analysis is required, the image frames are searched for based on the classification group, thus the image analysis may be conveniently and quickly performed.

BACKGROUND OF THE INVENTION

Generally, a preset tour camera is unmanned surveillance equipment that continuously takes images of a plurality of predetermined classification groups having different surveillance distances and angles, through predefined movement and stop operations.

In other words, because the preset tour camera enables simultaneously monitoring multiple classification groups by taking images thereof through a single image obtaining device, the number of image obtaining devices may be reduced, thus reducing installation and management cost.

As such a preset tour camera, a pan-tilt-zoom camera is widely used because a pan-tilt-camera typically has a panning function capable of horizontal rotation, a tilting function capable of vertical rotation, and a zooming function capable of changing a focal distance.

Here, the multiple image frames obtained in real-time by the preset tour camera are continuously stored in a storage medium indiscriminately rather than by being classified according to the classification groups. Namely, the multiple image frames are not classified by the classification groups, and stored as a form of one motion picture.

Therefore, when an accident occurs at a certain place among a plurality of surveillance places, all the image frames stored in the storage medium are sequentially searched and analyzed, thus much time and effort are required for the image analysis and it is difficult to promptly handle the accident.

To solve the above-mentioned problem, it is necessary to research a technique in which image frames for multiple classification groups, obtained by the preset tour camera, may be classified and stored by the classification groups.

SUMMARY OF THE INVENTION

Accordingly, the present invention has been made keeping in mind the above problems, and an object of the present invention is to provide an image classification method and apparatus for a preset tour camera in which image frames for multiple classification groups, obtained by the preset tour camera, are classified based on the classification groups using feature information, thus the image frames may be searched for and analyzed based on the classification groups.

An object of the present invention is not limited to the above-mentioned object, and other objects will be clearly understood from the following detailed description.

In order to accomplish the above object, an image classification method for a preset tour camera, according to the present invention, is configured to include: receiving an image frame obtained by a preset tour camera that takes images of multiple surveillance places; determining whether the preset tour camera is in a stationary state by comparing the image frame with a previous image frame; extracting feature information by analyzing the image frame when it is determined that the preset tour camera is in a stationary state; generating classification groups, distinguishable by the feature information and corresponding, respectively, to the surveillance places, in such a manner that the classification groups are not duplicated each other; and storing the image frame tagged with an index for distinguishing the classification group.

Desirably, between generating step and storing step, a step for classifying the image frame by the classification group based on the feature information is further included.

Desirably, after storing the image frame, the method may further include a step for updating the classification groups by removing a classification group to which the image frame is not classified during a predetermined reference time, among the classification groups.

Desirably, in a step for determining whether the preset tour camera is in a stationary state, if it is determined that both the image frame and the previous image frame were taken when the preset tour camera was in a stationary state, the image frame is stored with the index in the classification group to which the previous image frame is classified.

Also, to accomplish the above object, an image classification apparatus for a preset tour camera, according to the present invention, is configured to include: an image input unit for receiving an image frame obtained by a preset tour camera that takes images of multiple surveillance places; a motion check unit for determining whether the preset tour camera is in a stationary state by comparing the image frame with a previous image frame; a feature information extraction unit for extracting feature information by analyzing the image frame when the preset tour camera is in a stationary state; a classification group generation unit for generating classification groups, distinguishable by the feature information and corresponding, respectively, to the surveillance places, in such a manner that the classification groups are not duplicated each other; and an image storage unit for storing the image frame tagged with an index for distinguishing the classification group.

Desirably, the apparatus further includes an image classification unit for classifying the image frame by the classification groups according to the feature information.

Desirably, the apparatus further includes a classification group updating unit for updating the classification groups by removing a classification group to which the image frame is not classified during a predetermined reference time among the classification groups.

As described above, the present invention classifies multiple image frames, obtained by a preset tour camera simultaneously monitoring multiple classification groups, based on the classification groups using feature information included in each of the image frames, and stores the image frames by the classification groups. Therefore, when an accident occurs in a certain classification group, only an image frame of the corresponding classification group is searched for and analyzed, thus the accident may be quickly handled and easily solved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention relates to an image classification method and apparatus for a preset tour camera that may monitor multiple surveillance places by taking images thereof using a single camera.

Specifically, the image classification method and apparatus for a preset tour camera, according to the present invention, may sequentially receive image frames that are continuously taken by a single preset tour camera; classify the image frames by groups corresponding to the surveillance places; and store the classified image frames by the groups.

This characteristic is achieved by a configuration in which an image frame obtained by a preset tour camera is sequentially input; feature information is extracted by analyzing the input image frame to distinguish one surveillance place from another; a classification group is generated not to be duplicated by another group, based on the surveillance place classified by the extracted feature information; and the image frame is stored with an index by the classification group corresponding to the feature information.

Hereinafter, an image classification method for a preset tour camera, according to a preferred embodiment of the present invention will be described with reference to the accompanying drawing.

Figure 1:
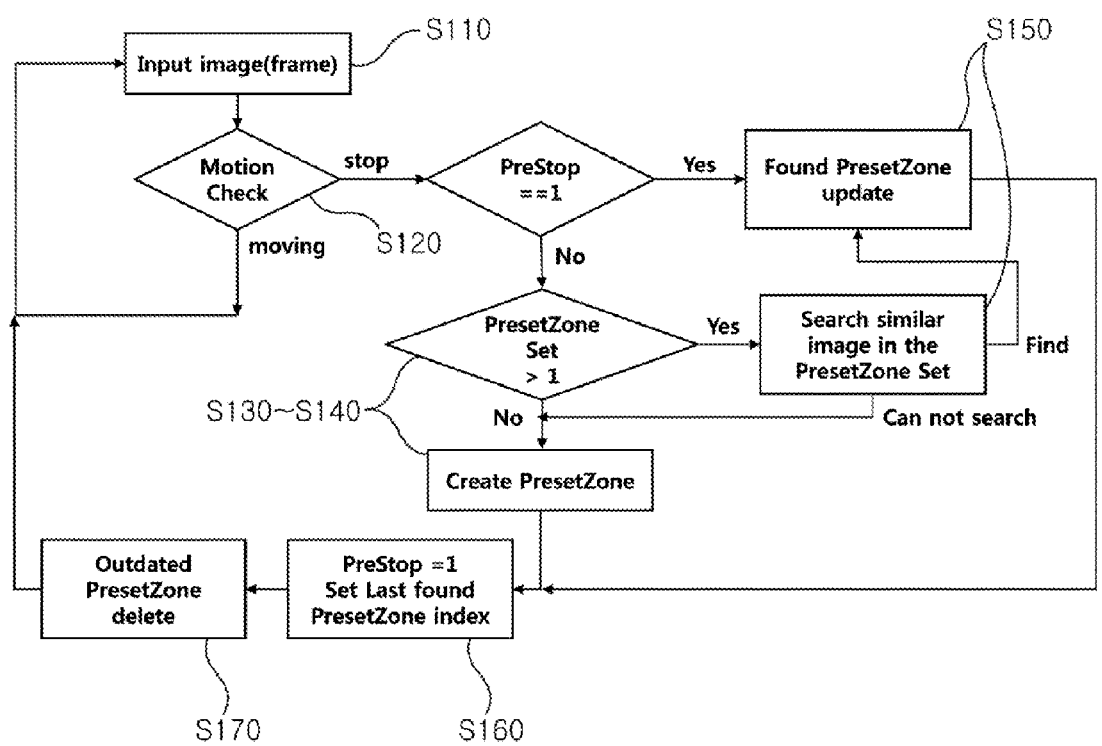
FIG. 1 is a flowchart for an image classification method for a preset tour camera, according to a preferred embodiment of the present invention.

FIG. 1 is a flowchart of an image classification method for a preset tour camera according to a preferred embodiment of the present invention.

As illustrated in FIG. 1, the image classification method for a preset tour camera according to a preferred embodiment of the present invention may include an image frame input step (S110), a motion check step (S120), a feature information extraction step (S130), a classification group generation step (S140), and an image frame storage step (S160).

Hereinafter, the above steps are described in detail.

First, the image frame input step (S110) is a step in which image frames continuously taken by a preset tour camera are sequentially input.

Namely, in the image frame input step (S110), the image frames continuously taken by a preset tour camera are sequentially input by being separated on a frame basis.

In this case, as the preset tour camera is configured as a pan-tilt-zoom camera, the panning, tilting, and zooming operations are performed by a fixed pattern to sequentially take images of a plurality of predetermined surveillance places according to a preset sequence.

In other words, image frames input from the preset tour camera include both image frames of the surveillance places, taken when the preset tour camera is in a stationary state, and image frames taken while the preset tour camera is moving from one place to another place among the multiple surveillance places.

In this case, the surveillance places may be freely changed depending on an external configuration for the operation of the preset tour camera. Namely, the surveillance places monitored by the preset tour camera may be maintained according to needs, a new surveillance place may be added to the existing surveillance places, or some of the existing surveillance places may be removed.

Next, the motion check step (S120) is a step for analyzing the image frames input at the image frame input step (S110), and for checking whether the preset tour camera is in a stationary state.

Namely, the motion check step (S120) is a step for checking whether the preset tour camera is in a stationary state or in motion by comparing an image frame input in a current frame with an image frame input in a previous frame.

In other words, it is determined that the image frames are taken either when the preset tour camera is in a stationary state or when it is in motion, by comparing the currently input image frame with the previously input image frame.

In this case, the currently input image frame and the previously input image frame may be compared based on pixel values thereof. For example, after image frames are converted to a gray level format, the pixel values of the image frames are compared. If a result of the comparison is greater than a reference, it is determined that the preset tour camera is in a stationary state, and if the result is equal to or less than the reference, it may be determined that the preset tour camera is in motion.

As a result of the determination, when it is determined that the preset tour camera is in a stationary state, the feature information extraction step (S130), which will be described later, is performed. Conversely, when it is determined that the preset tour camera is in motion, the process is returned to the above-mentioned image frame input step (S110).

This is because the image frames taken when the preset tour camera is in a stationary state correspond to image frames for a surveillance place and need to be classified, but the image frames taken when the preset tour camera is in motion are image frames for a place that is irrelevant to a surveillance place and do not need to be classified.

Next, the feature information extraction step (S130) is a step for extracting feature information by processing the image frames, determined in the motion check step (S120) to have been taken when the preset tour camera was in a stationary state.

Namely, the feature information extraction step (S130) is a step in which feature information corresponding to a certain surveillance place is extracted to distinguish an image frame for the surveillance place from among image frames determined to have been taken when the preset tour camera was in a stationary state.

In this case, the feature information may be obtained by the following processes. Image frames having a color level format are converted into image frames having a gray level format (image frames having a gray level format are not converted). Then, among a sobel mask, a prewitt mask, a laplacian mask, and a canny mask, one or more are selected and applied to the image frames, whereby contour information may be extracted, and the contour information may be the feature information.

Also, the feature information is extracted by applying a Speeded Up Robust Features (SURF) algorithm to the image frames, and the extracted information may be features less vulnerable to the change of an environment, such as the size of the image frame, external lighting, time, etc.

The use of the SURF algorithm enables matching image frames for the same surveillance place using the features even when an error occurs in panning, tilting, zooming operations due to the mechanical characteristics of the preset tour camera, or due to external physical effects.

This feature information is extracted to classify the image frames based on the taken surveillance places, and the number of pieces of the feature information corresponds to the number of surveillance places. For example, when four surveillance places are set, four different pieces of feature information may be extracted from the image frames.

Next, the classification group generation step (S140) is a step for generating a classification group that can be separated depending on the feature information extracted at the feature information extraction step (S130).

In other words, the classification group generation step (S140) generates a classification group not to be duplicated by another by comparing the feature information of the currently input image frame with feature information of all image frames that are previously input.

Namely, when comparing the feature information of the currently input image frame with that of all the previously input image frames, if identical feature information does not exist therebetween, a new classification group is generated, whereas when identical feature information exists, the currently input image frame belongs to a corresponding classification group, and a new classification group is not generated.

The classification groups generated as described above are separated according to the surveillance places, and the number thereof corresponds to the number of the surveillance places. For example, when four surveillance places are set, pieces of feature information are classified into four groups, and four classification groups are generated.

Finally, the image frame storage step (S160) is a step in which image frames are stored with an index for distinguishing the classification group.

In other words, the image storage step (S160) is a step for storing the images frames with an index to be separated by the classification group, the index being for classifying the image frames by the classification groups that are classified based on the feature information.

Consequently, the image frames are stored with the index by classification groups that are separated according to the surveillance places monitored by the preset tour camera.

Therefore, when an accident occurs in a certain surveillance place among multiple surveillance places, not all of the image frames are searched but only image frames stored in a classification group corresponding to the relevant surveillance place are searched.

Here, as illustrated in FIG. 1, an image frame classification step (S150) may be further included between the feature information extraction step (S140) and the image frame storage step (S160).

The image frame classification step (S150) is a step in which image frames are classified into the classification groups generated at the classification group generation step (S140).

In other words, the image frame classification step (S150) is a step for classifying image frames into a classification group, which has been generated to correspond to feature information. For example, when a total of four surveillance places are set, sequentially input image frames are classified into one group among the four classification groups, according to a total of four pieces of feature information.

Accordingly, the image frames continuously taken by the preset tour camera are classified into the classification groups, each of the classification groups corresponding to each of surveillance places monitored by the preset tour camera.

However, if it is determined at the motion check step (S120) that both the currently input image frame and the previously input image frame are taken when the preset tour camera is in a stationary state, the feature information extraction step (S130) and the classification group generation step (S140) are skipped, and the currently input image frame is immediately classified into a classification group including the previously input image frame and stored with the index for the classification group.

This is because both the currently input image frame and the previously input image frame contain the image of an identical surveillance place when the preset tour camera was in a stationary state, thus feature information for separating the surveillance place is identically extracted.

On the other hand, as illustrated in FIG. 1, a classification group updating step (S170) may be further included after the image frame storage step (S160).

The classification group updating step (S170) is a step in which a set of classification groups is newly updated by removing a classification group into which image frames are not classified during a predetermined reference time.

This is because a surveillance place monitored by the preset tour camera may be added or removed depending on the configuration of the preset tour camera. Accordingly, even when a certain surveillance group is removed through the configuration of the preset tour camera, the classification groups are updated and the processing speed is not affected.

Hereinafter, an image classification apparatus for a preset tour camera, according to a preferred embodiment of the present invention is described with reference to the accompanying drawing.

Figure 2:
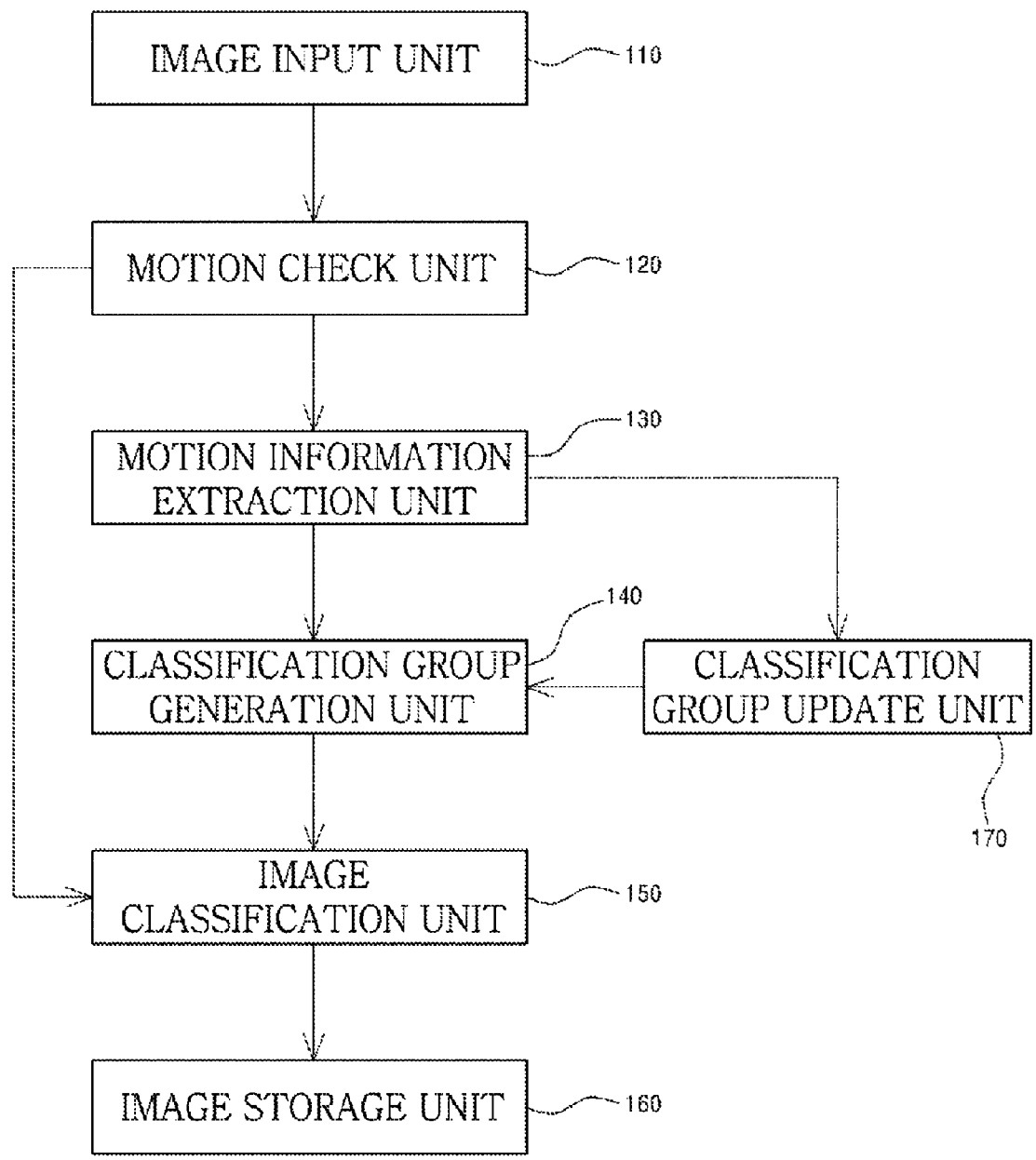
FIG. 2 is a block diagram of an image classification apparatus for a preset tour camera, according to a preferred embodiment of the present invention.

FIG. 2 is a block diagram of an image classification apparatus for a preset tour camera, according to a preferred embodiment of the present invention.

As illustrated in FIG. 2, the image classification apparatus for a preset tour camera, according to a preferred embodiment of the present invention, may include an image input unit 110, a motion check unit 120, a feature information extraction unit 130, a classification group generation unit 140, and an image storage unit 160.

Hereinafter, the above-mentioned units will be described in detail.

First, the image input unit 110 performs the image frame input step (S110). Namely, the image input unit 110 sequentially receives image frames on a frame basis, the image frames being consequently taken by the preset tour camera.

Next, the motion check unit 120 performs the motion check step (S120). Namely, the motion check unit 120 determines whether the preset tour camera is in motion by comparing an image frame that is currently input through the image input unit 110 with an image frame that has been input as a previous image frame.

Next, the feature information extraction unit 130 performs the feature information extraction step (S130). In other words, the feature information extraction unit 130 analyzes image frames, determined by the motion check unit 120 to have been taken when the preset tour camera was in a stationary state, and extracts feature information that may be separated according to the surveillance place.

Next, the classification group generation unit 140 performs the classification group generation step (S140). Namely, the classification group generation unit 140 compares feature information of the currently input image frame, which is extracted by the feature information extraction unit 130, with pieces of feature information of all the previously input image frames, and generates a classification group not to be duplicated by another group.

Finally, the image storage unit 160 performs the image frame storage step (S160). In other words, the image storage unit 160 stores image frames by the classification group, with an index for distinguishing the classification group, the classification group being generated not to be duplicated by another group.

On the other hand, an image classification unit 150 may be further included as illustrated in FIG. 2, wherein the image classification unit 150 performs the image frame classification step (S150). Namely, the image classification unit 150 classifies the image frames according to the classification group generated by the classification group generation unit 140.

Also, as illustrated in FIG. 2, the classification group updating unit 170 may be further included. The classification group updating unit 170 performs the classification group updating step (S170). Namely, the classification group updating unit 170 updates a set of the classification groups by removing a classification group, into which image frames are not classified during a predetermined time, among the classification groups generated by the classification group generation unit 140.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image classification method for a preset tour camera, comprising:
    receiving a sequence of image frames obtained by a preset tour camera that takes images of multiple surveillance places;
    determining whether the preset tour camera is in a stationary state by comparing pixel values representative of a newer image frame with pixel values representative of a previous image frame until a difference in the pixel values of the previous image frame and the pixel values of the newer image frame is greater than a predetermined reference value;
    when the difference in the pixel values of the two compared image frames is greater than the predetermined reference value, converting the newer image frame into a grayscale format and extracting contour information of the newer image frame by analyzing the image frame when it is determined that the preset tour camera is in a stationary state;
    generating classification groups, distinguishable by the contour information and corresponding, respectively, to the surveillance places, in such a manner that the classification groups do not duplicate each other;
    classifying the image frames by the classification group based on the contour information and tagging the image frames with the classification group; and
    storing the image frames tagged with an index distinguishing the classification group.

2. The image classification method of claim 1, further comprising a step for, after storing the image frames,
    updating the classification groups by removing one or more image frames that are not classified during a predetermined reference time frame from the image frames of classification groups.

3. The image classification method of claim 1, wherein a newer image frame is stored with the index representative of the classification group of the previous image frame when the previous image frame has already been classified with a classification group.

4. A preset tour camera, configured to:
    receive a sequence of image frames taken from multiple surveillance places;
    determine whether the preset tour camera is in a stationary state by comparing compare pixel values of a newer image frame with pixel values of a previous image frame until a difference in the pixel values of the previous image frame and the pixel values of the newer image frame is greater than a predetermined reference value;
    when the difference in the pixel values of the two compared image frames is greater than the predetermined reference value, converting the newer image frame into a grayscale format and extract contour information of the newer image frame by analyzing the image frame when the preset tour camera is in a stationary state;
    generate classification groups distinguishable by the contour information and corresponding, respectively, to the surveillance places, in such a manner that the classification groups do not duplicate each other;
    classify the image frame by the classification group according to the contour information and tagging the image frame with the classification group; and
    store the image frame tagged with an index distinguishing the classification group.

5. The preset tour camera of claim 4, further configured to one or more image frames that are not classified during a predetermined reference time frame from the image frames of the classification groups.

6. The preset tour camera of claim 4, wherein the preset tour camera is configured to store a newer image frame with the index representative of the classification group of the previous image frame when said previous image frame has already been classified with a classification group.

* * * * *